US011523066B2

United States Patent
Li

(10) Patent No.: US 11,523,066 B2
(45) Date of Patent: Dec. 6, 2022

(54) CAMERA IMAGING METHOD, CAMERA SYSTEM AND UNMANNED AERIAL VEHICLE (UAV)

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 92 days.

(21) Appl. No.: 17/081,207

(22) Filed: Oct. 27, 2020

(65) Prior Publication Data
US 2022/0132013 A1  Apr. 28, 2022

(51) Int. Cl.
| | | |
|---|---|---|
| H04N 5/235 | (2006.01) | |
| H04N 5/247 | (2006.01) | |
| H04N 5/265 | (2006.01) | |
| B64D 47/08 | (2006.01) | |
| B64C 39/02 | (2006.01) | |

(52) U.S. Cl.
CPC ......... *H04N 5/2353* (2013.01); *B64C 39/024* (2013.01); *B64D 47/08* (2013.01); *H04N 5/247* (2013.01); *H04N 5/265* (2013.01); *B64C 2201/027* (2013.01); *B64C 2201/127* (2013.01)

(58) Field of Classification Search
None
See application file for complete search history.

(56) References Cited

U.S. PATENT DOCUMENTS

2017/0359515 A1* 12/2017 Harris ............... G06K 9/00
2020/0143545 A1*  5/2020 Weng ............... B64C 39/024

* cited by examiner

*Primary Examiner* — Heather R Jones

(57) ABSTRACT

The present invention discloses a camera imaging method, a camera system and an unmanned aerial vehicle (UAV). The camera imaging method is applied to a camera system of the UAV. The camera system includes a signal trigger device and a signal receiving device. The method includes: acquiring, by the signal trigger device, a shooting instruction; generating, by the signal trigger device, a trigger signal with a preset trigger frame rate according to the shooting instruction; and performing, by the signal receiving device, exposure at the preset trigger frame rate according to the trigger signal; where the preset trigger frame rate is greater than a default exposure frame rate of the signal receiving device. According to the present invention, an exposure frame rate of the signal receiving device is adjusted to the preset trigger frame rate, so that the signal receiving device can perform exposure according to the preset trigger frame rate, and synchronous dual-light exposure is implemented.

9 Claims, 3 Drawing Sheets

CAMERA IMAGING METHOD, CAMERA SYSTEM AND UNMANNED AERIAL VEHICLE (UAV)

BACKGROUND

Technical Field

The present invention relates to the field of an unmanned aerial vehicle (UAV), and in particular, to a camera imaging method, a camera system and an unmanned aerial vehicle.

Related Art

At present, an important use of an industrial UAV is aerial reconnaissance. A payload of such UAV generally carries a camera system that combines a combination of visible light and infrared thermal imaging. Such dual light is fused together for output. If the dual light is not exposed synchronously, a smear or tandem phenomenon will occur on a picture, affecting a shooting effect.

SUMMARY

In order to overcome a problem of unsynchronized dual-light exposure of an aerial camera in the prior art, the present invention is intended to provide a camera imaging method, a camera system and an unmanned aerial vehicle (UAV).

The present invention provides a camera imaging method applied to a camera system of the UAV. The camera system includes a signal trigger device and a signal receiving device. The method includes:

acquiring, by the signal trigger device, a shooting instruction;

generating, by the signal trigger device, a trigger signal with a preset trigger frame rate according to the shooting instruction; and performing, by the signal receiving device, exposure at the preset trigger frame rate according to the trigger signal; where the preset trigger frame rate is greater than a default exposure frame rate of the signal receiving device.

In an embodiment of the present invention, the signal trigger device is a first imaging device, and the signal receiving device is a second imaging device, the preset trigger frame rate being a default exposure frame rate of the first imaging device, the default exposure frame rate of the first imaging device being greater than a default exposure frame rate of the second imaging device; and the performing, by the signal receiving device, exposure at the preset trigger frame rate according to the trigger signal includes:

performing, by the second imaging device, exposure at the default exposure frame rate of the first imaging device according to the trigger signal.

In an embodiment of the present invention, the method further includes:

fusing an image produced by the first imaging device at its default exposure frame rate with an image produced by the second imaging device through exposure at the default exposure frame rate of the first imaging device.

In an embodiment of the present invention, the signal trigger device is a main processor, and the signal receiving device is a first imaging device and a second imaging device, the preset trigger frame rate being a trigger frame rate of the main processor, the trigger frame rate of the main processor being greater than the default exposure frame rate of the first imaging device and a default exposure frame rate of the second imaging device, and the performing, by the signal receiving device, exposure at the preset trigger frame rate according to the trigger signal includes:

performing, by the first imaging device and the second imaging device, exposure at the trigger frame rate of the main processor according to the trigger signal.

In an embodiment of the present invention, the method further includes:

fusing an image produced by the first imaging device through exposure at the trigger frame rate of the main processor with an image produced by the second imaging device through exposure at the trigger frame rate of the main processor.

In an embodiment of the present invention, the first imaging device is a visible light imaging lens, and the second imaging device is an infrared imaging lens.

In an embodiment of the present invention, the first imaging device is an infrared imaging lens, and the second imaging device is a visible light imaging lens.

In an embodiment of the present invention, the method further includes:

performing zooming on an image produced through exposure of the visible light lens.

The present invention further provides a camera system, the camera system including a signal trigger device and a signal receiving device; where the signal trigger device is configured to acquire a shooting instruction; and generate a trigger signal with a preset trigger frame rate according to the shooting instruction; and the signal receiving device is configured to perform exposure at the preset trigger frame rate according to the trigger signal, where the preset trigger frame rate is greater than a default exposure frame rate of the signal receiving device.

In an embodiment of the present invention, the signal trigger device is a first imaging device, and the signal receiving device is a second imaging device, the preset trigger frame rate being a default exposure frame rate of the first imaging device, the default exposure frame rate of the first imaging device being greater than a default exposure frame rate of a second imaging device.

In an embodiment of the present invention, the signal trigger device is a main processor, and the signal receiving device is a first imaging device and a second imaging device, the preset trigger frame rate being a trigger frame rate of the main processor, the trigger frame rate of the main processor being greater than the default exposure frame rate of the first imaging device and the default exposure frame rate of the second imaging device.

In an embodiment of the present invention, the first imaging device is a visible light imaging lens, and the second imaging device is an infrared imaging lens.

In an embodiment of the present invention, the first imaging device is an infrared imaging lens, and the second imaging device is a visible light imaging lens.

The present invention further provides a UAV, including a fuselage, an arm connected to the fuselage, a power device configured to provide flight power for the UAV, and the foregoing camera system, the camera system being disposed on the fuselage.

Beneficial effects of the present invention are described below: by disposing the signal trigger device and the signal receiving device, the signal trigger device generates the trigger signal with the preset trigger frame rate according to the shooting instruction, and the signal receiving device performs exposure at the preset trigger frame rate according to the trigger signal, thereby implementing synchronous exposure and improving shooting quality.

DETAILED DESCRIPTION

The present invention is further described below with reference to the accompanying drawings and specific implementations. It should be noted that, the embodiments or technical features described below may be randomly combined to form new embodiments in case that no conflict occurs.

Figure 1:
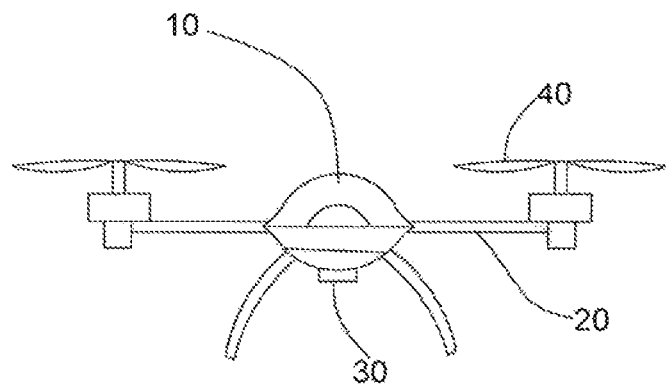
FIG. 1 is a schematic structural diagram of an unmanned aerial vehicle (UAV) according to an embodiment of the present invention.

As shown in FIG. 1, a camera imaging method according to an embodiment of the present invention is applied to a camera system of an unmanned aerial vehicle (UAV). The UAV 100 may be a suitable UAV, including a fixed-wing UAV and a rotary-wing UAV, such as a helicopter, a quadrotor and an aircraft with other numbers of rotors and/or rotor configuration. The UAV 100 may further be other movable objects, such as a manned aircraft, a model airplane, an unmanned airship and an unmanned hot air balloon.

Figure 2:
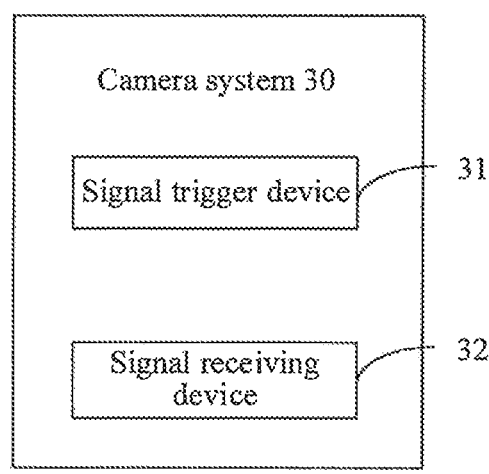
FIG. 2 is a schematic structural diagram of a camera system in a UAV according to an embodiment of the present invention.

In some embodiments, the UAV 100 includes a fuselage 10, an arm 20 connected to the fuselage 10, a power device 40 disposed on the arm 20 and a camera system 30 disposed on the fuselage 10. The power device 40 is configured to provide flight power for the UAV 100. As shown in FIG. 2, the camera system 30 includes a signal trigger device 31 and a signal receiving device 32. The signal trigger device 31 is configured to acquire a shooting instruction, and generate a trigger signal with a preset trigger frame rate according to the shooting instruction.

The signal receiving device 32 is configured to perform exposure at the preset trigger frame rate according to the trigger signal. The preset trigger frame rate is greater than a default exposure frame rate of the signal receiving device.

Figure 3:
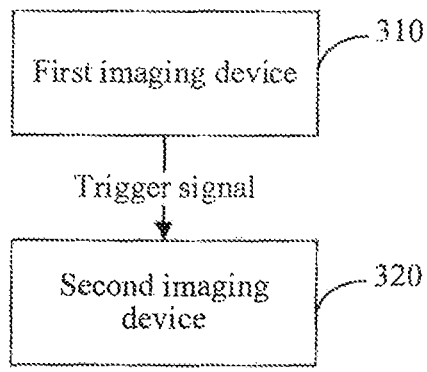
FIG. 3 is a schematic diagram of a first imaging device sending a trigger signal to a second imaging device according to an embodiment of the present invention.

As shown in FIG. 3, in an embodiment of the present invention, the signal trigger device 31 is a first imaging device 310, and the signal receiving device 32 is a second imaging device 320. The preset trigger frame rate is a default exposure frame rate of the first imaging device 310. The default exposure frame rate of the first imaging device 310 is greater than a default exposure frame rate of the second imaging device 320. The first imaging device 310 performs exposure according to the default exposure frame rate of the first imaging device, and sends a trigger signal to the second imaging device 320 before exposure. In other words, the first imaging device 310 performs exposure immediately after sending the trigger signal to the second imaging device 320. The second imaging device 320 performs exposure at the default exposure frame rate of the first imaging device according to the trigger signal, so that the first imaging device 310 and the second imaging device 320 implementing synchronous exposure.

Figure 4:
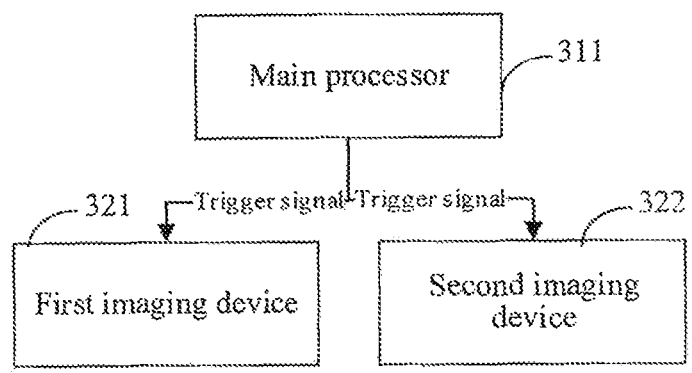
FIG. 4 is a schematic diagram of a main processor sending a trigger signal to a first imaging device and a second imaging device according to an embodiment of the present invention.

As shown in FIG. 4, in an embodiment of the present invention, the signal trigger device 31 may be a main processor 311 of the camera system 30, and the signal receiving device 32 is a first imaging device 321 and a second imaging device 322. The preset trigger frame rate is a trigger frame rate of the main processor 311. The trigger frame rate of the main processor 311 is greater than the default exposure frame rate of the first imaging device 321 and the default exposure frame rate of the second imaging device 322. A sending time interval between two adjacent trigger signals of the main processor 311 is smaller than an exposure time interval between two adjacent images when the first imaging device 321 performs exposure at its default exposure frame rate. A sending time interval between two adjacent trigger signals of the main processor 311 is smaller than an exposure time interval between two adjacent images when the second imaging device 322 performs exposure at its default exposure frame rate. The first imaging device 321 and the second imaging device 322 perform timing after exposure each time and perform exposure after receiving the trigger signal and re-timing. If receiving a trigger signal again when an exposure time corresponding to the default frame rate is not reached, the first imaging device and the second imaging device perform re-timing after the exposure. The rest can be done in a same manner. Both the first imaging device 321 and the second imaging device 322 are adjusted to perform exposure according to a frame rate of the trigger signal. The first imaging device 321 and the second imaging device 322 perform exposure at the trigger frame rate of the main processor 311 according to the trigger signal, thereby implementing synchronous exposure of the first imaging device 321 and the second imaging device 322.

In each of the foregoing embodiments, the first imaging device is a visible light imaging lens, and the second imaging device is an infrared imaging lens. Alternatively, the first imaging device is the infrared imaging lens, and the second imaging device is the visible light imaging lens.

Figure 5:
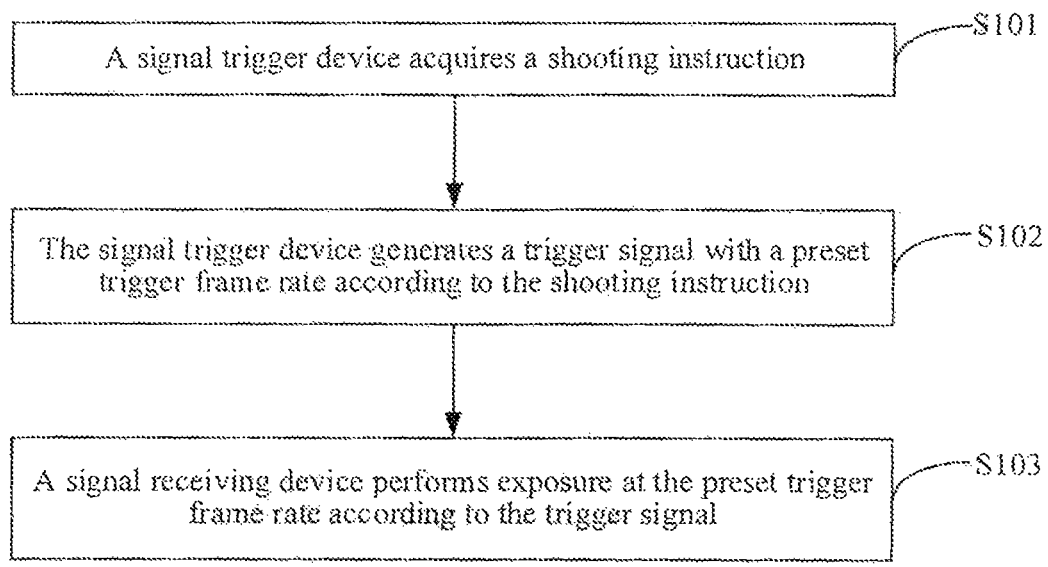
FIG. 5 is a flowchart of a camera imaging method according to an embodiment of the present invention.

As shown in FIG. 5, a camera imaging method according to an embodiment of the present invention is performed by the camera system 30 of the foregoing UAV 100, and the method includes:

Step S101: A signal trigger device acquires a shooting instruction.

For example, when a user operates a shooting button on a camera, the shooting instruction is generated.

Step S102: The signal trigger device generates a trigger signal with a preset trigger frame rate according to the shooting instruction.

The signal trigger device may be any of a first imaging device, a second imaging device, or a main processor. The first imaging device and the second imaging device perform exposure independently. The first imaging device performs the exposure according to a default exposure frame rate of the first imaging device when receiving no trigger signal. The second imaging device performs the exposure according to a default exposure frame of the second imaging device when receiving no trigger signal. The trigger signal may be sent by the first imaging device to the second imaging device according to the default exposure frame rate of the first imaging device. In this case, the preset trigger frame rate is the default exposure frame rate of the first imaging device. Alternatively, the second imaging device may send the trigger signal to the first imaging device according to the default exposure frame rate of the second imaging device. In this case, the preset trigger frame rate is the default exposure frame rate of the second imaging device. Alternatively, the main processor sends the trigger signal to the first imaging device and the second imaging device according to its trigger frame rate, and the first imaging device or the second imaging device performs the exposure according to a trigger frame rate of the main processor. In this case, the preset trigger frame rate is the trigger frame rate of the main processor.

Step S103: The signal receiving device performs exposure at the preset trigger frame rate according to the trigger signal. The preset trigger frame rate is greater than a default exposure frame rate of the signal receiving device.

As shown in FIG. 3, in a first implementation, a signal trigger device is a first imaging device, and a signal receiving device is a second imaging device. A preset trigger frame rate is a default exposure frame rate of the first imaging device. A trigger signal is sent by the first imaging device to the second imaging device according to the default exposure frame rate of the first imaging device. The default exposure frame rate of the first imaging device is greater than a default exposure frame rate of the second imaging device. An exposure time interval between two adjacent images produced by the first imaging device through exposure at its default exposure frame rate is smaller than an exposure time interval between two adjacent images produced by the second imaging device through exposure at its default exposure frame rate. The first imaging device performs exposure at the default exposure frame rate of the first imaging device, and sends a trigger signal to the second imaging device before exposure. In other words, the first imaging device performs exposure immediately after sending the trigger signal to the second imaging device. The second imaging device performs exposure at the default exposure frame rate of the first imaging device according to the trigger signal, so that the first imaging device and the second imaging device implement synchronous exposure. In an embodiment of the present invention, the method may further include: fusing an image produced by the first imaging device at its default exposure frame rate with an image produced by the second imaging device through exposure at the default exposure frame rate of the first imaging device to obtain a captured image.

Figure 6:
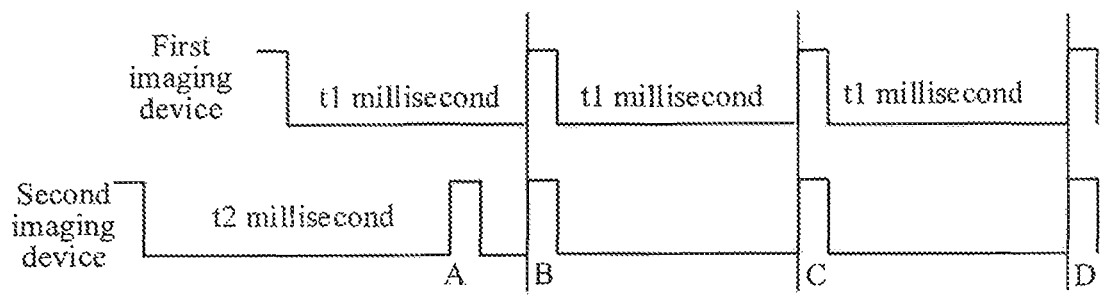
FIG. 6 is a schematic diagram of signal synchronization between a first imaging device and a second imaging device according to an embodiment of the present invention.

In particular, as shown in FIG. 6, an exposure time interval between two adjacent images of the first imaging device is t1, and an exposure time interval between two adjacent images of the second imaging device is t2, t2>t1. Timers are disposed in both the first imaging device and the second imaging device. Re-timing is performed after exposure each time to perform a next exposure. When receiving a shooting instruction, the first imaging device performs one exposure after a time t1, and at the same time sends a trigger signal to the second imaging device. The second imaging device performs one exposure after a time t2 (that is, at a point A). When the trigger signal reaches the second imaging device at a time (that is, at a point B), exposure is performed again. After the exposure ends, timing is performed. After t1 (that is, at a point C), the trigger signal reaches the second imaging device, and the second imaging device performs exposure, and re-timing is performed after the exposure. Because t2>t1, when the time does not reach t2, the second imaging device performs the exposure. The rest can be done in a same manner. The second imaging device is adjusted to perform one exposure every time t1, so that exposure times of the first imaging device and the second imaging device are the same, implementing synchronous exposure of the first imaging device and the second imaging device. Images, produced through exposure of each frame of the first imaging device and the second imaging device, are fused to obtain a captured image of each frame.

In a first implementation, the first imaging device is a visible light lens, and the second imaging device is an infrared thermal imaging lens. The visible light lens performs exposure at its default frame rate, and at the same time sends a trigger signal to the infrared imaging lens. The infrared imaging lens performs exposure according to the trigger signal.

In another implementation, the first imaging device is an infrared thermal imaging lens, and the second imaging device is a visible light lens. The infrared thermal imaging lens performs exposure at its own default frame rate, and at the same time sends a trigger signal to the visible light lens. The visible light lens performs exposure according to the trigger signal.

As shown in FIG. 4, in another embodiment of the present invention, a signal trigger device is a main processor, and a signal receiving device is a first imaging device and a second imaging device. A trigger signal is sent from the main processor to the first imaging device and the second imaging device. A preset trigger frame rate is a trigger frame rate of the main processor. The trigger frame rate of the main processor is greater than a default exposure frame rate of the first imaging device and a default exposure frame rate of the second imaging device. A sending time interval between two adjacent trigger signals of the main processor is smaller than an exposure time interval between two adjacent images when the first imaging device performs exposure at its default exposure frame rate. A sending time interval between two adjacent trigger signals of the main processor is smaller than an exposure time interval between two adjacent images when the second imaging device performs exposure at its default exposure frame rate. The first imaging device and the second imaging device perform timing after exposure each time and perform exposure after receiving the trigger signal and re-timing. If receiving a trigger signal again when an exposure time corresponding to the default frame rate is not reached, the first imaging device and the second imaging device perform re-timing after the exposure. The rest can be done in a same manner. Both the first imaging device and the second imaging device are adjusted to perform exposure according to a frame rate of the trigger signal. The first imaging device and the second imaging device perform the exposure at the trigger frame rate of the main processor according to the trigger signal, thereby implementing synchronous exposure of the first imaging device and the second imaging device. Images generated by the first imaging device and the second imaging device through the exposure according to the trigger frame rate of the main processor are fused to obtain a captured image.

The first imaging device is a visible light imaging lens, and the second imaging device is an infrared imaging lens. Alternatively, the first imaging device is the infrared imaging lens, and the second imaging device is the visible light imaging lens.

In an embodiment of the present invention, an image produced by the visible light lens through exposure is zoomed and then fused with the infrared imaging lens, to ensure resolution of an output image.

In the foregoing embodiment, through generation of the trigger signal, the exposure frame rate of the first imaging device or the second imaging device is adjusted, so as to implement synchronous exposure of the first imaging device and the second imaging device, and ensure definition of an image output by the camera.

It may be learned from description of the foregoing implementations that, a person skilled in the art may clearly understand that the present invention may be implemented by using software in addition to a necessary universal hardware platform. Based on such an understanding, the technical solutions in the present invention essentially or the part contributing to the prior art may be implemented in a form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disk.

It should be noted that the sequence numbers of the foregoing embodiments of the present invention are merely for description purpose but do not represent the preference of the embodiments. Moreover, the terms "include", "comprise", and any variants thereof in this specification are intended to cover a non-exclusive inclusion. Therefore, in the context of a process, an apparatus, an object, or a method that includes a series of elements, the process, apparatus, object, method or not only includes such elements, but also includes other elements not specified expressly, or may include inherent elements of the process, apparatus, object, or method. Without more limitations, elements defined by the sentence "including one" does not exclude that there are still other same elements in the processes, apparatuses, objects, or methods.

The foregoing implementations are merely exemplary implementations of the present invention, and are not intended to limit the protection scope of the present invention. Any non-substantive changes and replacement performed by a person skilled in the art based on the present invention all belong to the protection scope of the present invention.

What is claimed is:

1. A camera imaging method applied to a camera system of an unmanned aerial vehicle (UAV), the camera system comprising a signal trigger device and a signal receiving device, wherein the method comprises:
   acquiring, by the signal trigger device, a shooting instruction;
   generating, by the signal trigger device, a trigger signal with a preset trigger frame rate according to the shooting instruction; and
   performing, by the signal receiving device, exposure at the preset trigger frame rate according to the trigger signal; wherein the preset trigger frame rate is greater than a default exposure frame rate of the signal receiving device;
   wherein the signal trigger device is a first imaging device, and the signal receiving device is a second imaging device, the preset trigger frame rate being a default exposure frame rate of the first imaging device, the default exposure frame rate of the first imaging device being greater than a default exposure frame rate of the second imaging device; and
   the performing, by the signal receiving device, exposure at the preset trigger frame rate according to the trigger signal comprises:
   performing, by the second imaging device, exposure at the default exposure frame rate of the first imaging device according to the trigger signal.

2. The camera imaging method according to claim 1, wherein the method further comprises:
   fusing an image produced by the first imaging device at its default exposure frame rate with an image produced by the second imaging device through exposure at the default exposure frame rate of the first imaging device.

3. The camera imaging method according to claim 1, wherein the first imaging device is a visible light imaging lens, and the second imaging device is an infrared imaging lens.

4. The camera imaging method according to claim 3, wherein the method further comprises:
   performing zooming on an image produced through exposure of the visible light lens.

5. The camera imaging method according to claim 1, wherein the first imaging device is an infrared imaging lens and the second imaging device is a visible light imaging lens.

6. A camera system, comprising a signal trigger device and a signal receiving device, wherein
   the signal trigger device is configured to acquire a shooting instruction; and
   generate a trigger signal with a preset trigger frame rate according to the shooting instruction; and
   the signal receiving device is configured to perform exposure at the preset trigger frame rate according to the trigger signal, wherein the preset trigger frame rate is greater than a default exposure frame rate of the signal receiving device;
   wherein the signal trigger device is a first imaging device, and the signal receiving device is a second imaging device, the preset trigger frame rate being a default exposure frame rate of the first imaging device, the default exposure frame rate of the first imaging device being greater than a default exposure frame rate of the second imaging device.

7. The camera system according to claim 6, wherein the first imaging device is a visible light imaging lens and the second imaging device is an infrared imaging lens.

8. The camera system according to claim 6, wherein the first imaging device is an infrared imaging lens and the second imaging device is a visible light imaging lens.

9. An unmanned aerial vehicle (UAV), comprising a fuselage, an arm connected to the fuselage, a power device configured to provide flight power for the UAV, and the camera system according to claim 6, the camera system being disposed on the fuselage.

* * * * *